Figure 1:
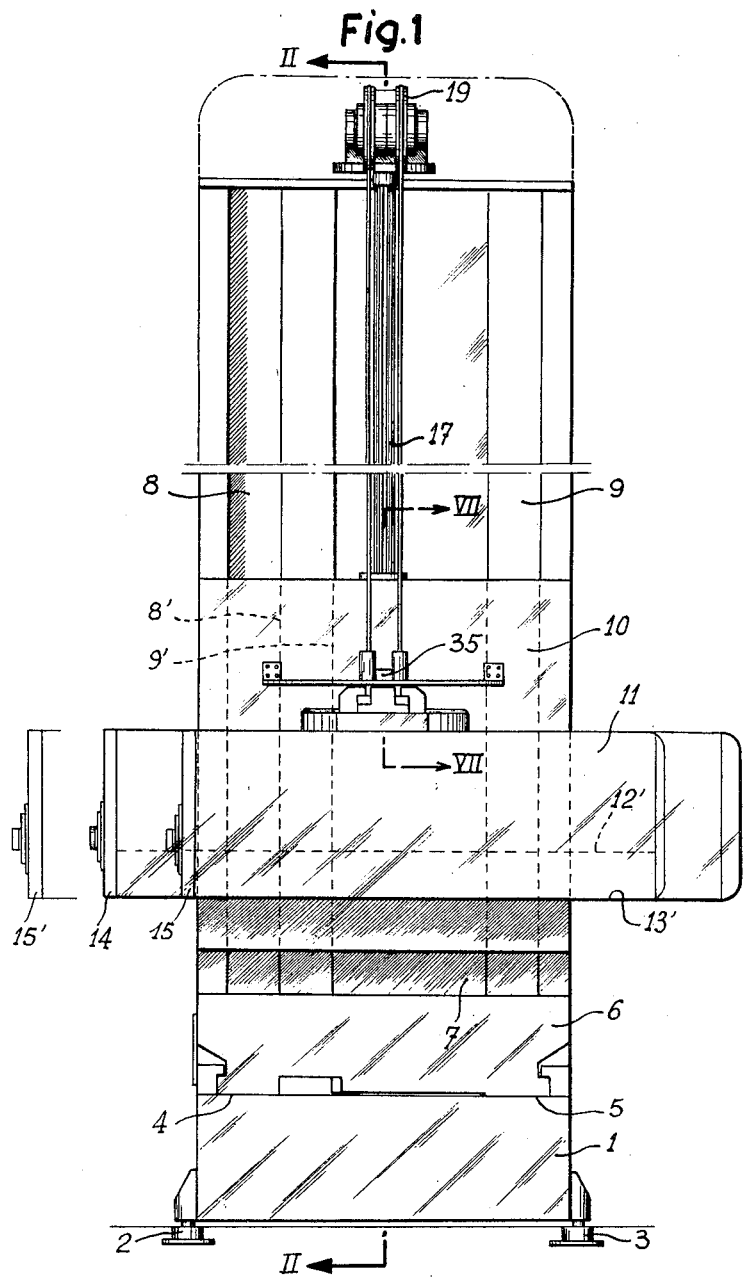

Feb. 2, 1965 R. DEFLANDRE 3,168,000
BALANCE COMPENSATING DEVICES
Filed April 1, 1963 7 Sheets-Sheet 1

Feb. 2, 1965 R. DEFLANDRE 3,168,000
BALANCE COMPENSATING DEVICES
Filed April 1, 1963 7 Sheets-Sheet 3

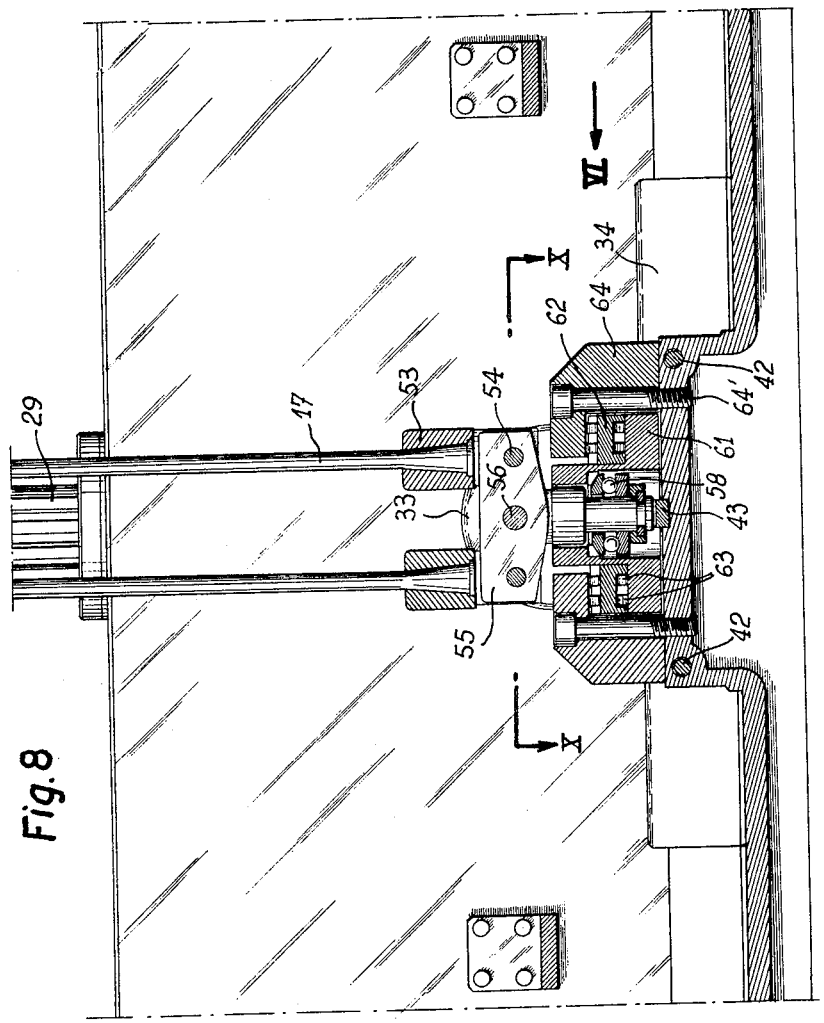
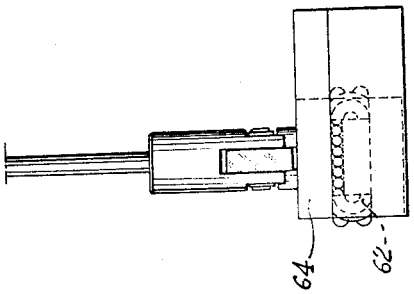

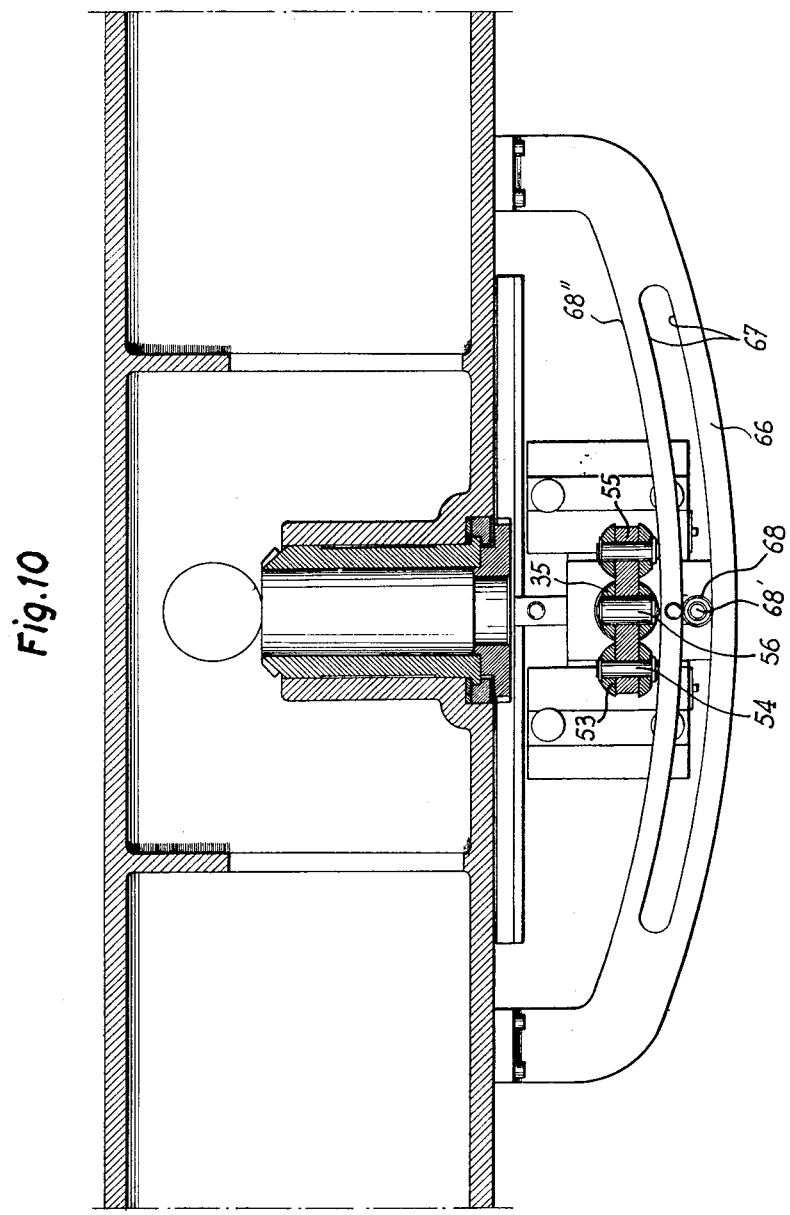

United States Patent Office 3,168,000
Patented Feb. 2, 1965

3,168,000
BALANCE COMPENSATING DEVICES
René Deflandre, Paris, France, assignor to Société dite: Derefa Etablissement pour le Développement Recherches et Fabrications Industrielles, Vaduz, Liechtenstein
Filed Apr. 1, 1963, Ser. No. 269,577
Claims priority, application France, Apr. 5, 1962, 893,377
10 Claims. (Cl. 90—11)

The movable headstock of a milling and boring machine is a heavy part which comprises, in addition to the tool-carrying spindle, all the elements and parts necessary for its rotation and its advance as well as all auxiliary functions.

The longitudinal movement of this part creates variable overhang forces applied to the slideways of the various bearing carriages and to the levelling jacks of the machine bed. The compressions and sinkings thus produced, which are themselves variable, very substantially affect the precision of the movement of the headstock and give rise to inadmissible machining errors in the parts manufactured.

In particular, for certain high precision machining (for instance, the machining of speed-reduction gears) in which the boring and the machined surfaces must have a highly accurate correspondence of which the tolerance must often be less than 1/100 mm., it is very difficult and very complicated to achieve this degree of accuracy, which can only be achieved today by more or less complicated and expensive means and by trial and error.

The object of the present invention is to remedy this disadvantage by substantially eliminating the overhang force created by the movement of the machine part (headstock in the case of a milling and boring machine) movable on its slide.

To this end, instead of setting up a balancing device, common to the headstock and to its supporting slide (as in conventional machines) in order to compensate the overhang force, balancing means are so constructed and arranged on the machine that the weight of the headstock is effectively balanced at the center of gravity thereof throughout the range of its sliding movements.

In accordance with the invention, the balancing of the headstock is formed by a counterweight or other equivalent balancing part which may not only move vertically but also effect a reverse horizontal movement of the same amplitude as that effected by the headstock when the latter moves on its supporting slide, the said headstock being suspended from a point situated substantially in the vertical line passing through the centre of gravity.

Furthermore, the assembly of the headstock and the counterweight is pivotally mounted on an axis fixed with respect to the machine, any movement of the headstock along its slides giving rise to a movement in the reverse direction of the counterweight, the resultant of the two moving loads (headstock and counterweight) constantly passing through the axis of the pivot.

In a preferred embodiment of the invention, the movement of the counterweight is effected in a circular movement, the supporting pulleys of the suspension cables of the latter and of the headstock being arranged on a pivoting beam mounted on the top of the upright of the machines.

Figure 2:
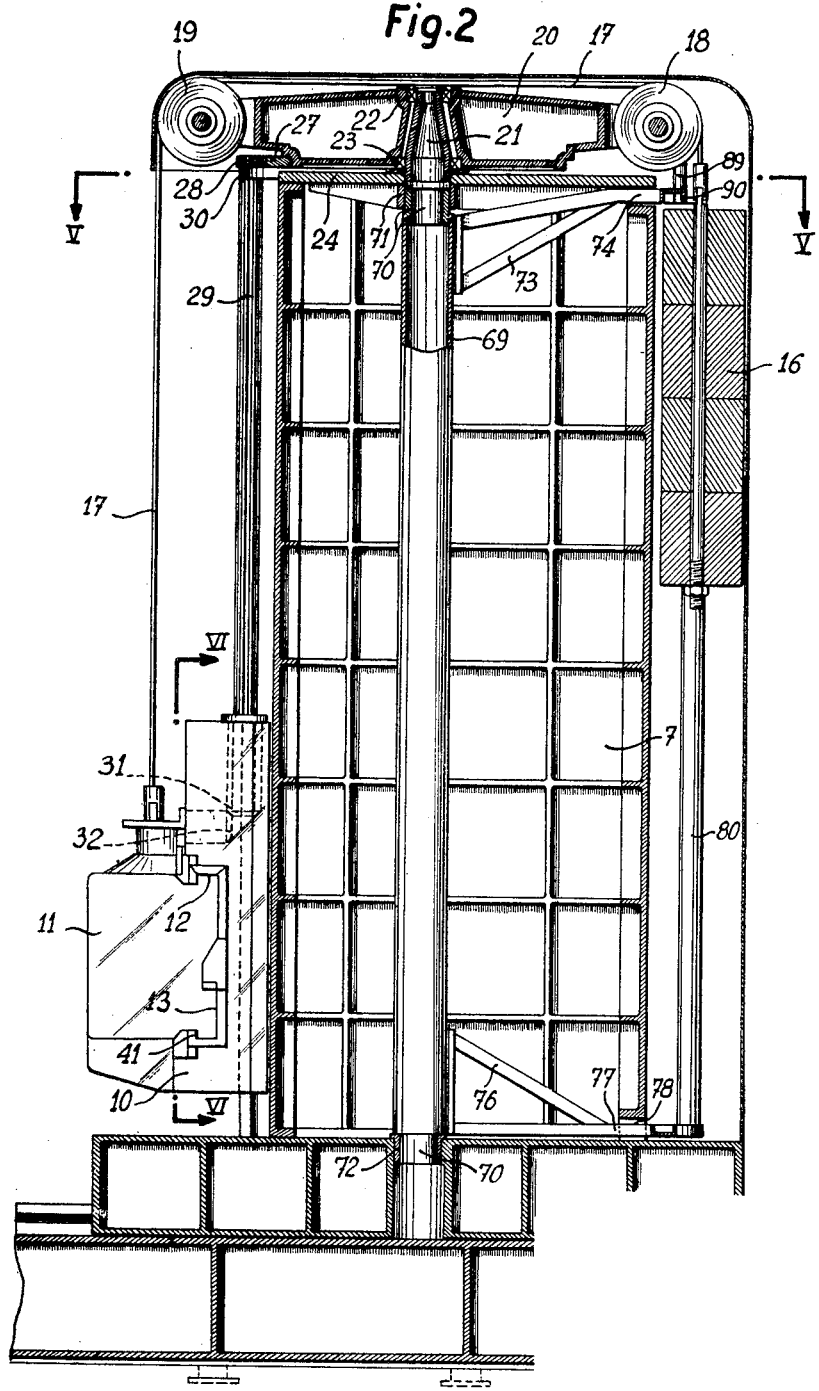
Figure 3:
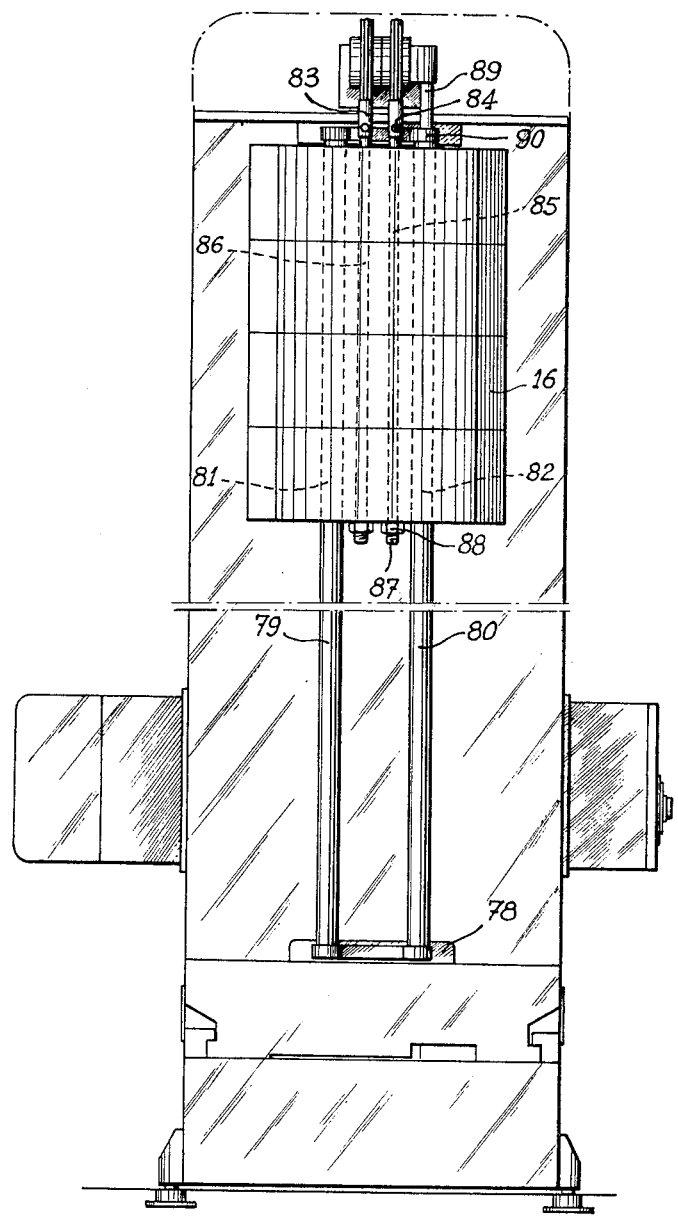
Figure 4:
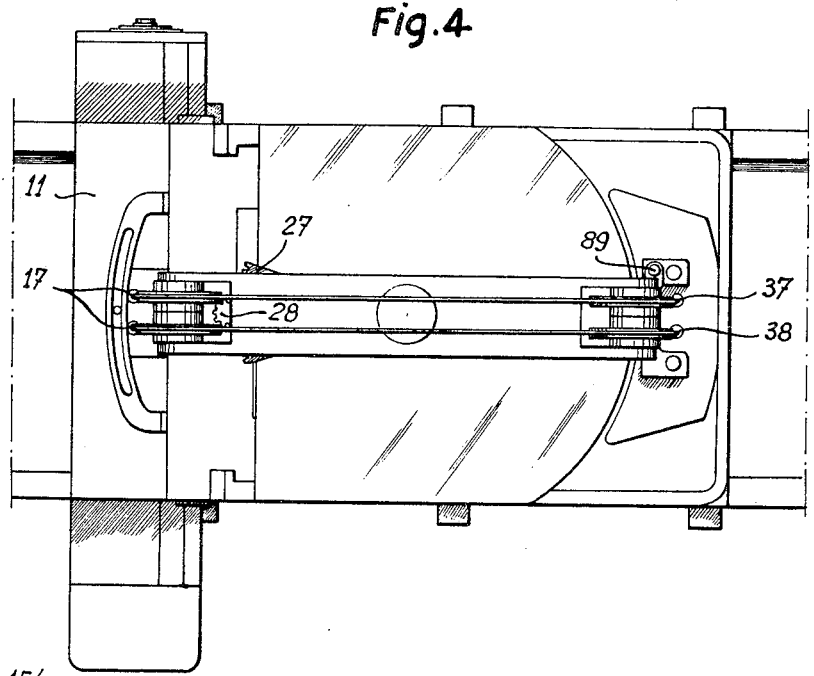
Figure 5:
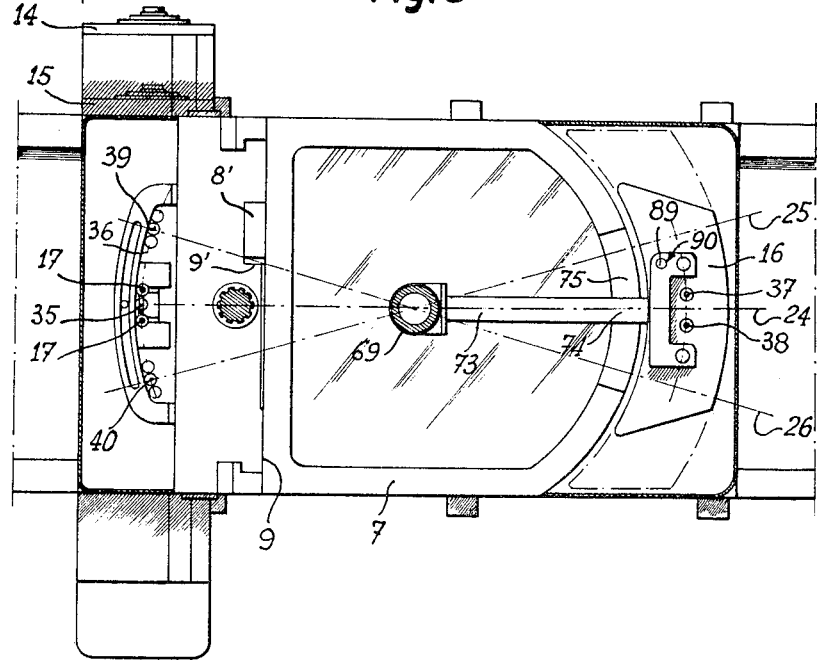
Figure 7:
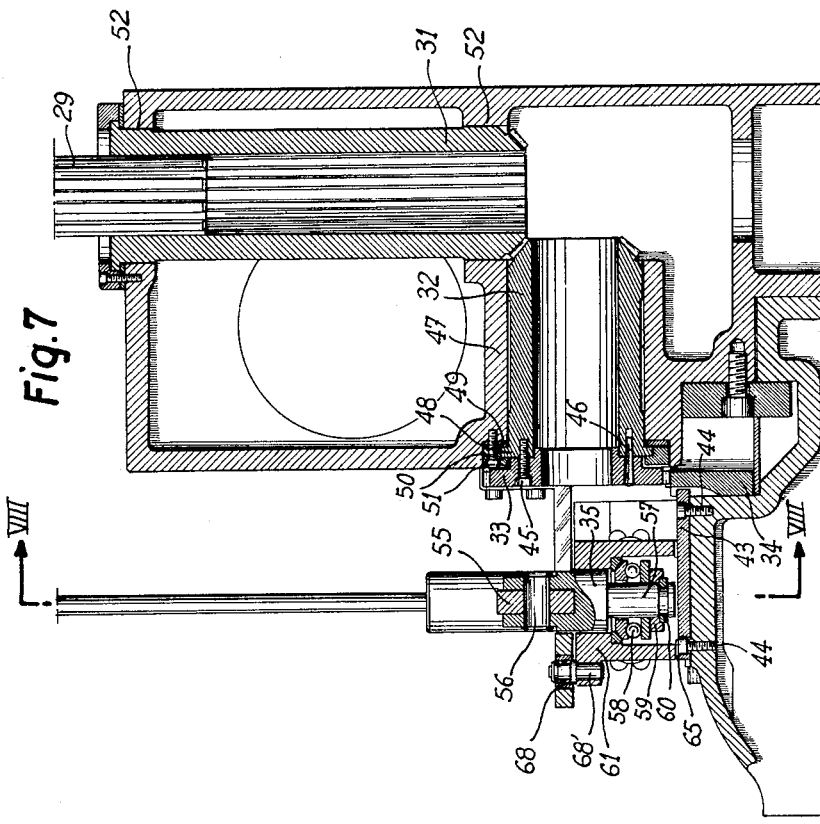
Figure 6:
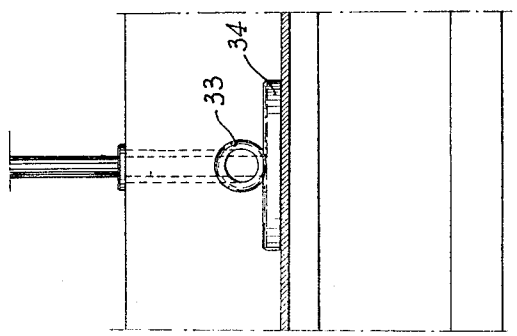

In order that the invention may be more clearly understood, reference will now be made to the accompanying drawings, which, by way of example, show the invention applied to a milling and boring machine comprising a headstock movable on a supporting slide, although it will be understood that the invention may be applied to any machine which comprises a horizontally mobile part on a slide, in which the said movement may produce overhang effects. In the accompanying drawings:

FIGURE 1 shows a front view of a milling and boring machine fitted with a device in accordance with the invention, FIGURE 2 shows a section along the line II—II of FIGURE 1, FIGURE 3 shows an end view of the milling and boring machine of FIGURES 1 and 2, seen from the right of FIGURE 2, FIGURE 4 shows a plan view of FIGURE 2, FIGURE 5 also shows a plan view of FIGURE 2, but limited to the plane V—V of the said FIGURE 2, FIGURE 6 shows a partial view along the line VI—VI of FIGURE 2, FIGURE 7 shows a section along the line VII—VII in FIGURE 1 of a part of the machine, to an enlarged scale, FIGURE 8 shows a section along the line VIII—VIII of FIGURE 7, FIGURE 9 shows an end view of a part of the machine shown in FIGURE 8, seen from the right of the said figure, and FIGURE 10 shows a section along the line X—X in FIGURE 8.

Referring firstly to FIGURES 1 and 2, these figures diagrammatically show the essential parts of a horizontal milling and boring machine, viz. a bed 1 supported by two rows of jacks 2, 3, and provided with slideways 4, 5 along which a base 6 fixed to an upright 7 provided with vertical slideways 8, 9 along which is free to move a slide piece or saddle 10 supporting a headstock 11, the said headstock being free in its turn to move horizontally along the slideways 12, 13 provided on the said slide piece.

The headstock 11 has been shown in the middle of its horizontal travel. The position of its front surface 14 may therefore be placed at 15, 15', according to the portions shown in finer lines in FIGURE 1. It will be seen that the left-hand portion of the headstock is overhanging over a distance increasing in proportion to the horizontal movement of the headstock on the saddle from position 15 to position 15'. It therefore gives rise to variable reactions on the saddle, the upright, the base and the bed, so that the distribution of pressures at different points on the guiding slideways is constantly varying. The oil film between the said slideways is therefore exposed to variable pressures depending on the length of overhang of the headstock on the saddle. Similarly, the distribution of loads on the rows of jacks is effected in a variable manner, modifying the compression stresses on the said parts and on the concrete constituting the foundation.

The result is a lack of accuracy in machining. However small the variations on the inclination of the headstock and therefore of the axis of the spindle, it is nonetheless true that the desired high degree of accuracy, which is indispensable with certain high-precision machinings, cannot be achieved in this manner.

A more specific object of the invention is to provide a device having a compensating counterweight 16 formed in four pieces (see FIGURE 2) and directly connected to the headstock by chains or cables 17 flexing on pulleys 18, 19 supported by a beam 20 pivoting about a pivot 21, on tapered roller bearings 22, 23. The pivot is mounted on a support plate 24 fixed to the top part of the upright. The pulley shafts are at equal distances from the pivot axis and the weight of the counterweight is substantially equal to that of the headstock. The latter is suspended by cables 17 substantially in the vertical line passing through the centre of gravity of the headstock.

It will be seen that this results in the correspondence of a reverse movement of the counterweight, of the same amplitude, to any movement of the headstock. The counterweight takes up the successive positions 25, 24, 26 in FIGURE 5, when the front surface of the headstock is in the successive positions 15, 14, 15' (FIG. 1). In this way the resultant of the two moving loads, namely the headstock and the counterweight, respectively, constantly passes through the axis of the pivot and there result invariable reactions on the slideways 4, 5 and on the jacks 2, 3.

Moreover, considering that the headstock is entirely balanced by the counterweight, the result is that the overhang forces created by its movement no longer occur either on the slideways 12, 13 (see FIGURE 2) which guide the headstock longitudinally, or on the slideways 8', 9' for the vertical guiding of the saddle (see FIGURE 5). Thus all tilting effects deriving from overhang are eliminated.

Turning now to FIGURE 4, the drive device for the pivoting beam 20 will now be described. It is made up of a toothed sector 27 which is fixed to the beam 20 and which is in mesh with a pinion 28 keyed to a splined rod 29 (see FIGURE 2) which rotates in a bearing 30 fixed to the upright. The drive of the splined rod by the headstock is effected by means of two bevel gears 31, 32 (FIG. 7), a spur pinion 33 and a rack 34 which will be described hereinafter in greater detail.

Referring more particularly to FIGURES 4 and 5, it will be seen that to effect a vertical lowering of the cables towards their attachment clevis 35 on the headstock, it is necessary both for the axis of said clevis to describe an arc 36 (see FIGURE 5) of a radius equal to that described by the attachment points 37, 38 of the cables on the counterweight and for the clevis 35 to be free to rotate by a small angle about its own axis, so that the cables can take up positions 39, 40 (shown diagrammatically). Thus the axis of the clevis 35 moves slightly towards the right (looking at FIG. 5) when the headstock effects each of its half-travels, and the said axis is so positioned that the points 39, 40 are located in the vertical line passing through the central gravity of the headstock. In this way, the balancing effort created by the counterweight gives rise to reactions, acting constantly in the same direction, on the slideway 12 and flange 41 of slideway 13 (see FIGURE 2).

The arrangements for driving the pivoting beam and for fastening the cables to the headstock are shown in detail, on a larger scale, in FIGURES 7 to 10.

In FIGURES 7 and 8 is shown the rack 34 which is fixed to the headstock by two screws 42 in FIG. 8 and longitudinally positioned by the end of a key 43 adjusted in corresponding recesses and fixed by two screws 44 in FIG. 7.

The rack, when driven by the headstock, rotates the pinion 33 and the bevel gear 32 to which it is fixed by six screws 45 and two pins 46. The gear 32 is centred by a corresponding recess 47 in the saddle and may rotate in the said recess. The axial reaction of the bevel gear 32 is resisted by a cylindrical collar 48 gripped between an adjustment washer 49 and a ring 50 fixed to the saddle by six screws 51. The bevel gear 31 is centred in a corresponding recess 52 in the saddle. The axial reaction is supported in the same way as in the case of the gear 32. The splined rod 29 is supported at its upper part by the bearing 30 (see FIGURE 2) and slides in the bevel gear 31. It drives the pivoting beam whatever be the height of the saddle.

The two suspension cables 17 of the headstock are fixed at their lower end into clevises 53 (FIGURE 10) which are provided with pins 54 engaging in corresponding holes in a rocking lever 55 itself provided with a pin 56 connecting it to the clevis 35. The cylindrical end 57 of the said clevis is connected to a spherical ball thrust bearing 58 (see FIGURE 7) by means of a ring 59 and through a two-part washer 60. The ball thrust bearing is located inside a recess made in a small carriage 61 provided with two slideways having cylindrical rollers 62 and fixed by screws 63 (see FIGURES 7 and 8). The roller slideways bear on two flanges 64 which are secured to the headstock by screws 64'.

The longitudinal guiding is provided by the key 43 which is adjusted in a corresponding recess 65 in the carriage (see FIGURE 7). The mounting of the carriage and of the clevis on roller slides and ball thrust bearing has been shown by way of example.

The transverse drive of the carriage in a circular path is effected by means of a circular guide 66 (see FIGURE 10) provided with a groove 67 which is itself circular and is of suitable radius, in which a needle roller 68 is located, this roller driving the said carriage via a stud 68' fixed to the latter. The pivotal drive of the clevis 35 is effected by the inner edge 68" of the guide 66 on which the outer cylindrical surface of the body of the two clevises 53 bear.

Turning once again to FIGURES 2 to 5, the means used to effect the rotary drive and the vertical guiding of the counterweight will now be described.

A hollow shaft 69 is located in the axis of the pivot 21, the ends of the said hollow shaft being provided with trunnions 70 which are free to rotate at one end in a bearing 71 forming part of the support plate 24, and at the other end in a socket 72 adjusted and bolted into the base. An angle-iron 73 is bolted to the upper end of the hollow shaft, the outer end 74 of the said angle-iron passing through a groove 75 (FIG. 5) made in the upper part of the upright 7. Similarly, an angle-iron 76 is fixed to the lower end, the end 77 of this angle-iron passing through a groove 78. These two angle-irons are connected by two rods 79, 80 which pass into holes 81, 82 made in the counterweight, these holes having a slightly larger diameter to insure the sliding thereof.

The counterweight is connected to the cables by two clevises 83 (see FIGURE 3) of which the pins 84 engage in corresponding holes made in the upper end of two rods 85 which pass through the counterweight in holes 86. The lower end of each rod is screw threaded as at 87 and receives a nut 88, this nut enabling the position in length of the attachment point to be adjusted. The drive in rotation of the counterweight and of its supporting frame is effected by a rod 89 fixed to the pivoting beam 20. The said rod is inserted in a hole 90 made in the angle-iron 73.

It will be understood that the present invention is not limited to the embodiment which has been described and illustrated, but on the contrary covers all variant embodiments and applications.

I claim:

1. In a milling and boring machine having an upright with a front face and a rear face and vertical slideways on said front face thereof, a saddle mounted for sliding movement on said vertical slideways of said upright and having horizontal slideways, and a headstock mounted for sliding movement on said horizontal slideways of said saddle, the provision of means for balancing the weight of said headstock in such sliding movements thereof, said balancing means comprising a horizontal beam mounted at a point intermediate both ends thereof for pivotal movement on a vertical axis on the top of said upright so that one end of said beam constantly hangs over said headstock, a loose pulley mounted at each end of said beam, flexible suspension means passed over both said pulleys and having one end thereof attached to said headstock substantially on the vertical line passing through the center of gravity of said headstock, a counterweight movable along the rear face of said upright and attached to the other end of said flexible suspension means and having a weight substantially equal to the weight of said headstock, and means for pivoting said beam about said vertical axis in unison with the horizontal sliding movement of said headstock on said saddle.

2. In a milling and boring machine having an upright with a front face and a rear face and vertical slideways on said front face thereof, a saddle mounted for sliding movement on said vertical slideways of said upright and having horizontal slideways, and a headstock mounted for sliding movement on said horizontal slideways of said saddle, the provision of means for balancing the weight of said headstock in such sliding movements thereof, said balancing means comprising a horizontal beam mounted at a point intermediate both ends thereof for pivotal movement on a vertical axis on the top of said upright so that one end of said beam constantly hangs over said headstock, a loose pulley mounted at each end of said beam, flexible suspension means passed over both said pulleys, a counterweight movable along the rear face of said upright and attached to one end of said flexible suspension means and having a weight substantially equal to the weight of said headstock, means for attaching the other end of said flexible suspension means to said headstock located substantially on the vertical line passing through the center of gravity of said headstock, said attaching means being mounted on said headstock for movement in a predetermined horizontal direction at right angels to said front face of said upright, means for pivoting said beam about said vertical axis in unison with the horizontal sliding movement of said headstock on said saddle, and locating means for moving said attaching means on said headstock in said predetermined horizontal direction to maintain said attaching means on the vertical line extending downwardly from said pulley carried by said end of said beam which overhangs said headstock as said headstock is moved horizontally on said saddle and as said beam is pivotally moved in unison with said headstock.

3. The combination of claim 2, wherein said locating means include guiding means carried by said saddle and having a horizontal arcuate portion coaxial with said pivoting axis of said beam and follower means carried by said attaching means and engaged with said arcuate portion of said guiding means.

4. The machine of claim 1, wherein said rear face of said upright is in the shape of a portion of a cylindrical surface coaxial with said pivoting axis of said beam.

5. The machine of claim 1, further comprising vertical guide means for said counterweight mounted for pivotal movement about said pivoting axis of said beam and operatively connected to said pivoting beam.

6. The machine of claim 5, wherein said vertical guide means for said counterweight are carried by a lower arm and an upper arm respectively secured to the lower and the upper ends of said vertical guide means and both mounted for pivotal movement in said upright coaxially with said pivoting axis of said beam, the machine further comprising means for operatively connecting said lower and upper arms.

7. The machine of claim 6 wherein said means for operatively connecting said lower and upper arms are constituted by a vertical shaft the ends of which are respectively secured to said arms on said pivoting axis of said beam.

8. The machine of claim 1, wherein said flexible means are attached to said headstock through a suspension device mounted on said headstock for pivotal movement on a vertical axis, said machine further comprising means for maintaining said suspension device in a constant angular relationship with respect to said beam.

9. The machine of claim 2, wherein said flexible means are attached to said attaching means through a suspension device mounted on said attaching means for pivotal movement on a vertical axis, said machine further comprising an arcuate guiding portion secured to said saddle coaxially with said pivoting axis of said beam, and a portion of said suspension device being in sliding engagement against said arcuate guiding portion.

10. The machine of claim 1, wherein the means for pivoting said beam comprise in combination: a toothed rack secured to said headstock in parallel relationship with said horizontal slideways, a first pinion rotatably mounted in said saddle and in mesh with said rack, a toothed sector secured to said pivoting beam, a second pinion in mesh with said toothed sector, a vertical shaft rotatably mounted with its axis in fixed relationship with respect to said upright, said vertical shaft carrying said second pinion, and a transmission between said pinions, said transmission including a sliding connection.

References Cited by the Examiner
UNITED STATES PATENTS
2,464,415 3/49 Philippe _____ 90—11

FOREIGN PATENTS
56,836 7/52 France.
(1st addition to 940,501)

WILLIAM W. DYER, JR., *Primary Examiner.*